US011195545B2

United States Patent
Jang et al.

(10) Patent No.: US 11,195,545 B2
(45) Date of Patent: Dec. 7, 2021

(54) METHOD AND APPARATUS FOR DETECTING AN END OF AN UTTERANCE

(71) Applicant: QUALCOMM Incorporated, San Diego, CA (US)

(72) Inventors: Hye Jin Jang, Seoul (KR); Kyu Woong Hwang, Daejeon (KR); Sungrack Yun, Seongnam-si (KR); Janghoon Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 16/657,552

(22) Filed: Oct. 18, 2019

(65) Prior Publication Data

US 2020/0321022 A1 Oct. 8, 2020

Related U.S. Application Data

(60) Provisional application No. 62/829,487, filed on Apr. 4, 2019.

(51) Int. Cl.
*G10L 25/87* (2013.01)
*G10L 15/22* (2006.01)
*G10L 15/16* (2006.01)

(52) U.S. Cl.
CPC .............. *G10L 25/87* (2013.01); *G10L 15/16* (2013.01); *G10L 15/22* (2013.01); *G10L 2015/223* (2013.01)

(58) Field of Classification Search
CPC ......... G10L 25/87; G10L 15/16; G10L 15/22; G10L 2015/223
USPC ...................................................... 704/253
See application file for complete search history.

(56) References Cited

U.S. PATENT DOCUMENTS

| 2016/0071520 A1* | 3/2016 | Hayakawa | G10L 17/04 704/247 |
| 2016/0111112 A1* | 4/2016 | Hayakawa | G10L 25/45 704/239 |
| 2017/0270919 A1* | 9/2017 | Parthasarathi | G10L 15/02 |

FOREIGN PATENT DOCUMENTS

| EP | 17708642 A * | 1/2019 | ............. G10L 15/20 |
| JP | 2019514045 A * | 5/2019 | ............. G10L 15/16 |

OTHER PUBLICATIONS

M. Parada and I. Sanches, "Visual Voice Activity Detection Based on Motion Vectors of MPEG Encoded Video," 2017 European Modelling Symposium (EMS), 2017, pp. 89-94, doi: 10.1109/EMS. 2017.26. (Year: 2017).*

S. Tripathi and S. Bhatnagar, "Speaker Recognition," 2012 Third International Conference on Computer and Communication Technology, 2012, pp. 283-287, doi: 10.1109/ICCCT.2012.64. (Year: 2012).*

Maas et al., "Combining Acoustic Embeddings and Decoding Features for End-of-Utterance Detection in Real-Time Far-Field Speech Recognition Systems", Amazon, USA, 5 pages.

(Continued)

*Primary Examiner* — Bharatkumar S Shah
(74) *Attorney, Agent, or Firm* — Qualcomm Incorporated

(57) ABSTRACT

A device to perform end-of-utterance detection includes a speaker vector extractor configured to receive a frame of an audio signal and to generate a speaker vector that corresponds to the frame. The device also includes an end-of-utterance detector configured to process the speaker vector and to generate an indicator that indicates whether the frame corresponds to an end of an utterance of a particular speaker.

30 Claims, 5 Drawing Sheets

(56) References Cited

OTHER PUBLICATIONS

Snyder et al., "Deep Neural Network Embeddings for Text-Independent Speaker Verification", Center for Language and Speech Processing & Human Language Technology Center of Excellence, The Johns Hopkins University, USA, 5 pages.
Dehak et al., "Front-End Factor Analysis for Speaker Verification" IEEE Transactions on Audio, Speech, and Language Processing, vol. 19, No. 4, May 2011, pp. 788-798.

* cited by examiner

METHOD AND APPARATUS FOR DETECTING AN END OF AN UTTERANCE

I. CROSS-REFERENCE TO RELATED APPLICATIONS

The present application claims priority from U.S. Provisional Patent Application No. 62/829,487, filed Apr. 4, 2019, entitled "METHOD AND APPARATUS FOR DETECTING AN END OF AN UTTERANCE," which is incorporated by reference in its entirety.

II. FIELD

The present disclosure is generally related to speech recognition.

III. DESCRIPTION OF RELATED ART

Speech recognition is conventionally used to enable an electronic device to interpret spoken questions or commands from users. Such spoken commands can be identified by analyzing an audio signal, such as a microphone input, to detect a start of a user utterance and an end of the user utterance. Automatic speech recognition can be performed based on the detected start and end of the utterance to interpret the utterance.

The end of an utterance ("end-of-utterance," or "EOU") is detected when a user finishes speaking. In a quiet environment, the pause or silence that occurs in the audio signal after utterance has ended can be an important cue to detect the end of an utterance. However, when there is background noise, searching the audio signal for a pause or silence can be insufficient to detect the end of an utterance. Voice activity detection can be used to distinguish speech from non-speech background noise to detect the end of an utterance. However, if the background noise includes voices, such as background conversations in a crowded room, voice activity detection can also fail to quickly and accurately to detect the end of a user's utterance. Delays in detecting the end of an utterance result in delays in responding to a user's voice commands or questions, degrading a user's experience.

IV. SUMMARY

According to one implementation of the present disclosure, a device to perform end-of-utterance detection includes a speaker vector extractor configured to receive a frame of an audio signal and to generate a speaker vector that corresponds to the frame. The device also includes a speaker vector comparator configured to process the speaker vector and to generate an indicator that indicates whether the frame corresponds to an end of an utterance of a particular speaker.

According to another implementation of the present disclosure, a method of end-of-utterance detection includes receiving, at an end-of-utterance detector, a frame of an audio signal. The method also includes generating, at the end-of-utterance detector, a speaker vector that corresponds to the frame. The method further includes generating, at the end-of-utterance detector and based on the speaker vector, an indicator that indicates whether the frame corresponds to an end of an utterance of a particular speaker.

According to another implementation of the present disclosure, a non-transitory computer-readable medium includes instructions that, when executed by one or more processors of a device, cause the one or more processors to perform operations for end-of-utterance detection. The operations include receiving, at the one or more processors, a frame of an audio signal and generating, at the one or more processors, a speaker vector that corresponds to the frame. The operations also include generating, at the one or more processors and based on the speaker vector, an indicator that indicates whether the frame corresponds to an end of an utterance of a particular speaker.

According to another implementation of the present disclosure, an apparatus to perform end-of-utterance detection includes means for generating a speaker vector that corresponds to a frame of an audio signal. The apparatus also includes means for generating, based on the speaker vector, an indicator that indicates whether the frame corresponds to an end of an utterance of a particular speaker.

V. BRIEF DESCRIPTION OF THE DRAWINGS

VI. DETAILED DESCRIPTION

Figure 1:
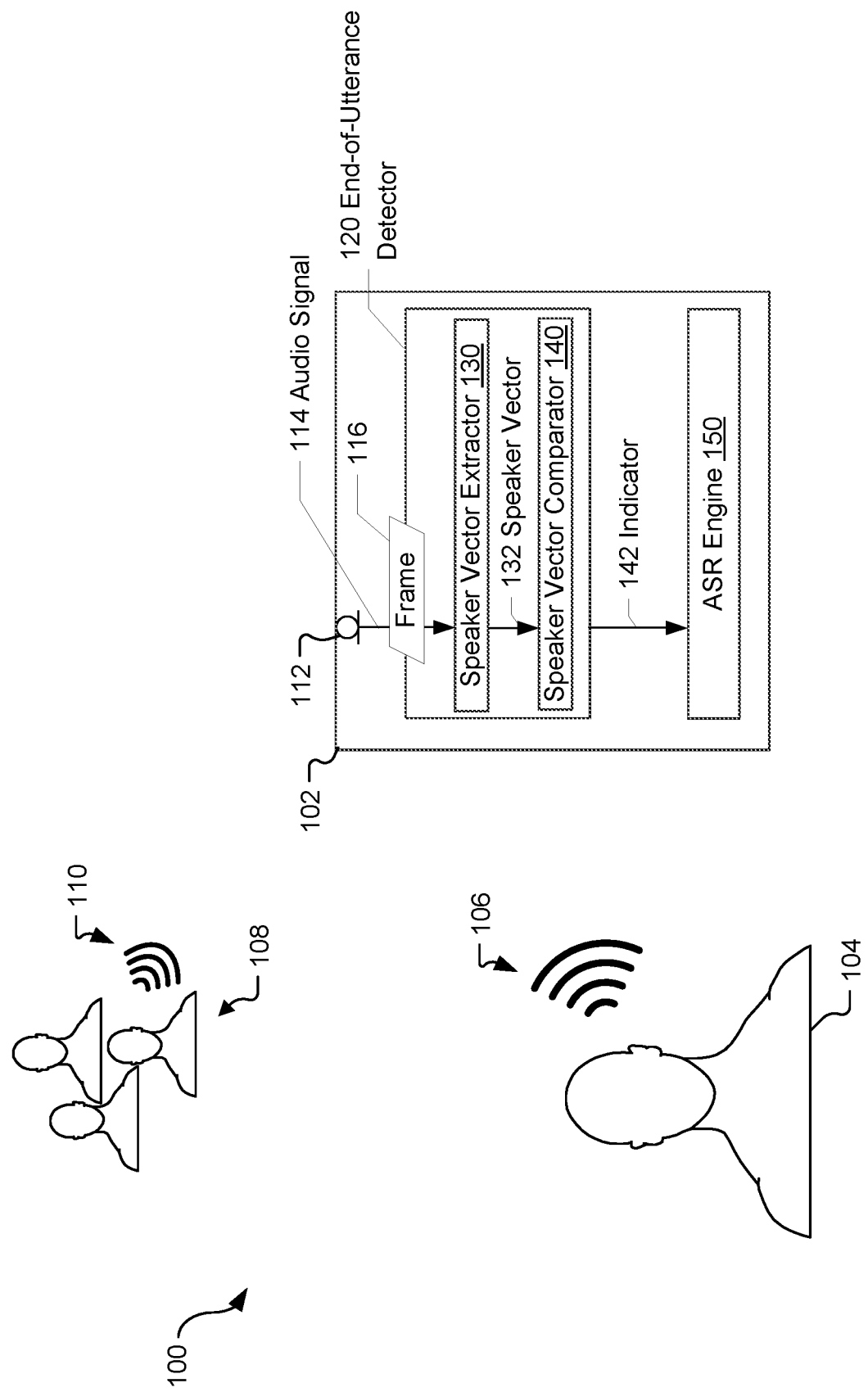
FIG. 1 is a diagram of a particular illustrative implementation of a system including a device operable to perform end-of-utterance detection.

Devices and methods to detect the end of an utterance are disclosed. Although detection of silence can be used in environments with relatively low background noise, and detection of voice activity can be used in environments with non-voice background noise, such techniques cannot reliably detect the end of an utterance in the presence of background noise that includes voice content. A delay in detecting the end of an utterance can result in a corresponding delay in responding to the user's voice commands or questions, which can render the user's experience less satisfactory.

Robust end-of-utterance detection can be attained, even in the presence of speech-like background noise, by analyzing the user's speech during the utterance to determine the user's speech characteristics, and then detecting when the received sound no longer matches the user's speech characteristics. For example, the user's speech can be processed to extract a set of values, referred to as a "speaker vector," that represents that user's speech characteristics. When the received sound no longer produces values that match the user's speech characteristics, the user's utterance is determined to have ended.

An end-of-utterance detector can be implemented using a statistical change detector or a deep neural network, as illustrative, non-limiting examples. In some implementations, a change in detected speaker characteristics, which can be used to determine the speaker's utterance has ended, can be determined by comparing the speaker vector with registered user vector, by detecting a difference in the speaker vector as compared to a moving average of the speaker vector during the utterance, by providing the speaker vector to a neural network trained to detect whether an end-of-utterance condition has been met, or a combination thereof.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearly wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wireless modems, laptop computers, personal computers, etc.

FIG. 1 depicts a system 100 that includes a device 102 that is configured to receive an utterance 106 (i.e., speech, such as a question or a command) from a user 104 and to detect the end of the utterance 106 even in the presence of background noise 110 that includes speech content from one or more other people 108. The device 102 includes a microphone 112, an end-of-utterance detector 120, and an automatic speech recognition (ASR) engine 150. In some implementations, the device 102 can include a wireless speaker and voice command device with an integrated assistant application (e.g., a "smart speaker" device), a portable communication device (e.g., a "smart phone"), or a vehicle system (e.g., a speech interface for an automobile entertainment system, navigation system, or self-driving control system), as illustrative, non-limiting examples.

The microphone 112 is configured to generate an audio signal 114 responsive to the received sound, including the utterance 106 and the background noise 110. The microphone 112 is configured to generate a series of frames (e.g., sets of samples of the audio signal 114), illustrated as a representative frame 116. In some implementations, the frame 116 is included in a sequence of multiple overlapping frames of the audio signal 114, such as described further with reference to FIG. 2. Although the microphone 112 is described as generating the frame 116, in other implementations the device 102 includes a frame generator that is coupled to the microphone 112 and that generates the frames (e.g., the frame 116) to be input to the end-of-utterance detector 120.

The end-of-utterance detector 120 includes a speaker vector extractor 130 and a speaker vector comparator 140. The speaker vector extractor 130 is configured to receive a frame 116 of an audio signal and to generate a speaker vector 132 that corresponds to the frame 116. In a particular implementation, the speaker vector extractor 130 is configured to process frame data to generate values of the speaker vector 132 that are indicative of a particular speaker. For example, the speaker vector extractor 130 can be configured as a deep neural network that is trained, using a training dataset of a large number of speakers, to distinguish each of the speakers from the other speakers based on voice and/or speech characteristics of the speaker and independent of the content of the speech. The speaker vector 132 can be generated as, or based on, an embedding vector output that represents values of one or more hidden layers of the trained neural network (e.g., a final hidden layer that provides outputs to an output layer of the neural network, such as a softmax output layer that may be removed after training). The speaker vector 132 represents values that are generated for an utterance that spans one or more frames and that are likely to distinguish the speaker of the utterance from other speakers, even though the speaker of the utterance may not be in the training set for the neural network. The speaker vector 132 is therefore distinct from other vectors that may be indicative of other acoustic characteristics, or general sound features, but that are not suitable for reliably distinguishing one speaker from another.

The speaker vector comparator 140 is configured to process the speaker vector 132 and to generate an indicator 142 that indicates whether the frame 116 corresponds to an end of an utterance of a particular speaker. In an example, the speaker vector comparator 140 is configured to compare the speaker vector 132 to at least one previously processed speaker vector that includes the utterance 106. In one example, the speaker vector comparator 140 is configured to compare the speaker vector 132 to a moving average of speaker vectors that include the at least one previously processed speaker vector. In another example, the speaker vector comparator 140 is configured to determine that the utterance 106 corresponds to a particular speaker (the user 104) based on a comparison of the previously processed speaker vector to a registered user vector corresponding to the user 104, and compare the speaker vector 132 to the registered user vector corresponding to the user 104 to determine whether the frame 116 includes speech of the user 104. In another example, the speaker vector comparator 140 includes a trained neural network classifier configured to process the speaker vector 132 to generate an output indicating whether the frame 116 corresponds to an in-utterance frame or an end-of-utterance frame. An example of components that can be implemented in the speaker vector comparator 140 is described in FIG. 3.

In some implementations, the speaker vector extractor 130, the speaker vector comparator 140, or both, are implemented using dedicated circuitry or hardware. In some implementations, the speaker vector extractor 130, the speaker vector comparator 140, or both, are implemented via execution of firmware or software. To illustrate, the device 102 can include a memory configured to store instructions and one or more processors configured to execute the instructions to implement the speaker vector extractor 130 and the speaker vector comparator 140, such as described further with reference to FIG. 5.

The automatic speech recognition engine 150 is configured to process one or more frames of the audio signal 114 that include the utterance 106. For example, the ASR engine 150 can receive a series of frames of the audio signal, starting with a detected beginning of the utterance and ending with a frame that is indicated, via the indicator 142, as a detected end of the utterance 106. The ASR engine 150 is configured to process the received series of frames and to generate an output indicative of the user's speech. For example, the ASR engine 150 can provide a text output of the content of the utterance 106 to another component of the device 102, such as a "virtual assistant" application or other application, to initiate an action based on the utterance 106.

By generating and processing the speaker vector 132 for the frame 116, end-of-utterance detection can be attained, even in the presence of speech-like background noise. The user's speech during the utterance can be analyzed to determine the user's speech characteristics, and the end of the utterance can be detected when the received sound no longer matches the user's speech characteristics. As a result, speech recognition processing can be performed with reduced latency and improved accuracy as compared to systems that perform end-of-utterance detection based solely on a period of silence or voice activity detection.

Figure 2:
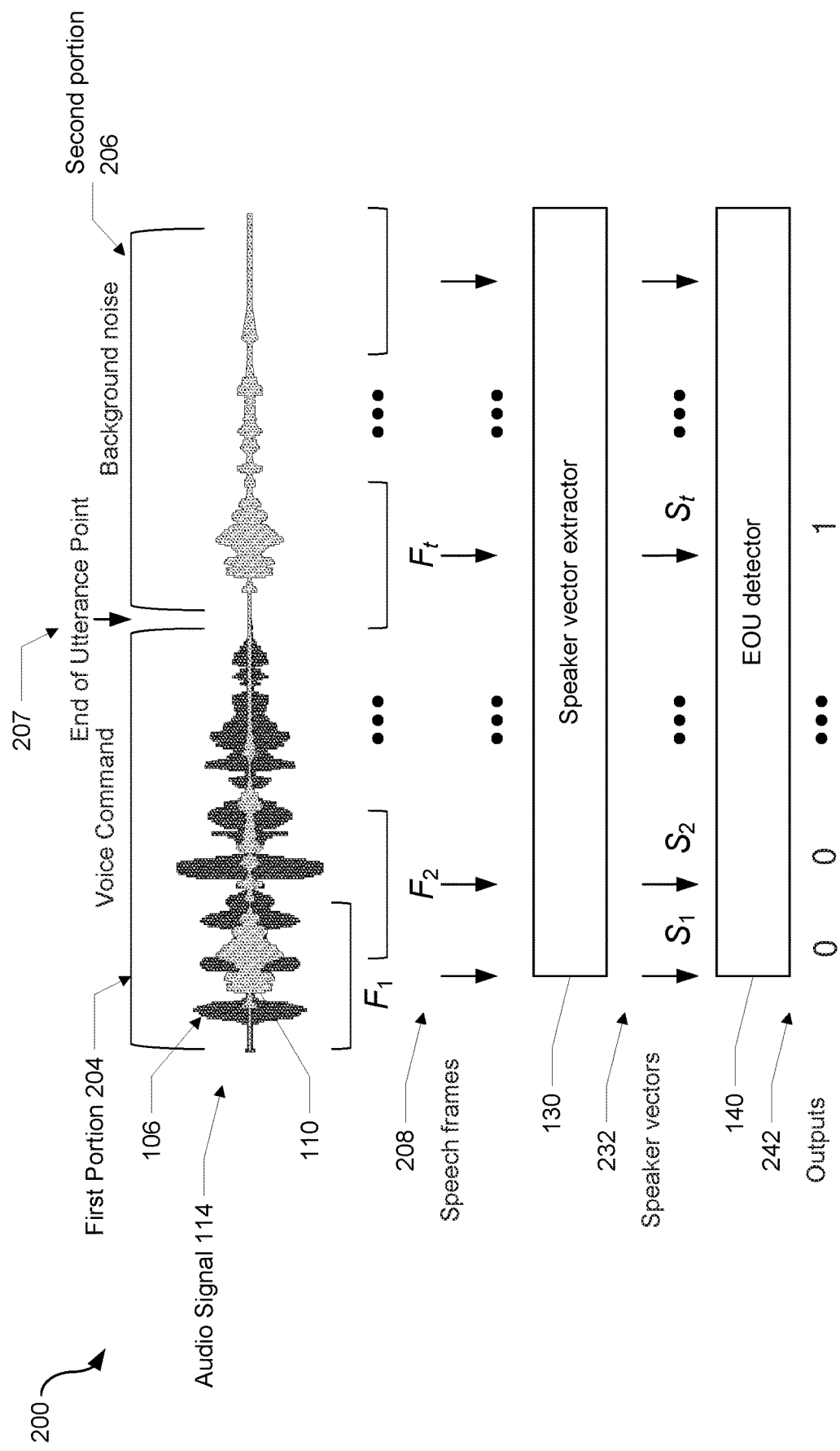
FIG. 2 is a diagram of a particular implementation of end-of-utterance detection that may be performed by the device of FIG. 1.

FIG. 2 is a diagram of a particular implementation of end-of-utterance detection 200 that may be performed by the device 102 of FIG. 1. The audio signal 114 includes a first portion 204 followed by a second portion 206. The first portion 204 includes a voice command (the utterance 106) that ends at an "end of utterance" point 207 and that is combined with the background noise 110. The second portion 206 begins after the end of utterance point 207 and includes the background noise 110.

The audio signal 114 is processed at the speaker vector extractor 130 as multiple overlapping speech frames 208, labelled $F_1, F_2, \ldots F_t$ (t is an integer greater than 2). To illustrate, any of the speech frames 208 can correspond to the frame 116. Frame $F_t$ is the first full frame of the audio signal 114 after the end of utterance point 207. The speech frames 208 are "overlapping" because at least part (e.g., one or more samples) of the audio signal 114 is in multiple sequential frames, such as frames $F_1$ and $F_2$. To illustrate, frame $F_1$ may include samples 0-1023 of the audio signal, and frame $F_2$ may include samples 512-1535 of the audio signal, so that samples 512-1023 are represented in both frames $F_1$ and $F_2$. However, in one or more other implementations, the speech frames 208 are not overlapping frames.

The speaker vector extractor 130 processes each of the speech frames 208 and generates corresponding speaker vectors 232, labelled $S_1, S_2, \ldots S_t$. To illustrate, the speaker vector extractor 130 processes frame $F_1$ to generate the speaker vector $S_1$, processes frame $F_2$ to generate the speaker vector $S_2$, and processes frame $F_t$ to generate the speaker vector $S_t$.

The speaker vector comparator 140 processes each of the speaker vectors 232 and generates a corresponding output 242. As illustrated, the outputs 242 have a first value ('0') during the first portion 204, in response to determining that speaker vectors $S_1, S_2, \ldots S_{t-1}$ corresponding to the frames $F_1, F_2, \ldots F_{t-1}$ indicate that an utterance is detected in each of the frames $F_1, F_2, \ldots F_{t-1}$ and that the utterance in each of the frames $F_1, F_2, \ldots F_{t-1}$ originates from the same particular speaker (e.g., the user 104). The output corresponding to the frame $F_t$ has a second value ('1') in response to determining that the speaker vector $S_t$ corresponding to the frame $F_t$ indicates that no speech from the same particular speaker (e.g., the user 104) is detected in the frame $F_t$ (although voices of one or more other speakers may be detected in the frame $F_t$). As a result, the change in the outputs 242 from the first value ('0') to the second value ('1') indicates an end of the utterance 106.

Figure 3:
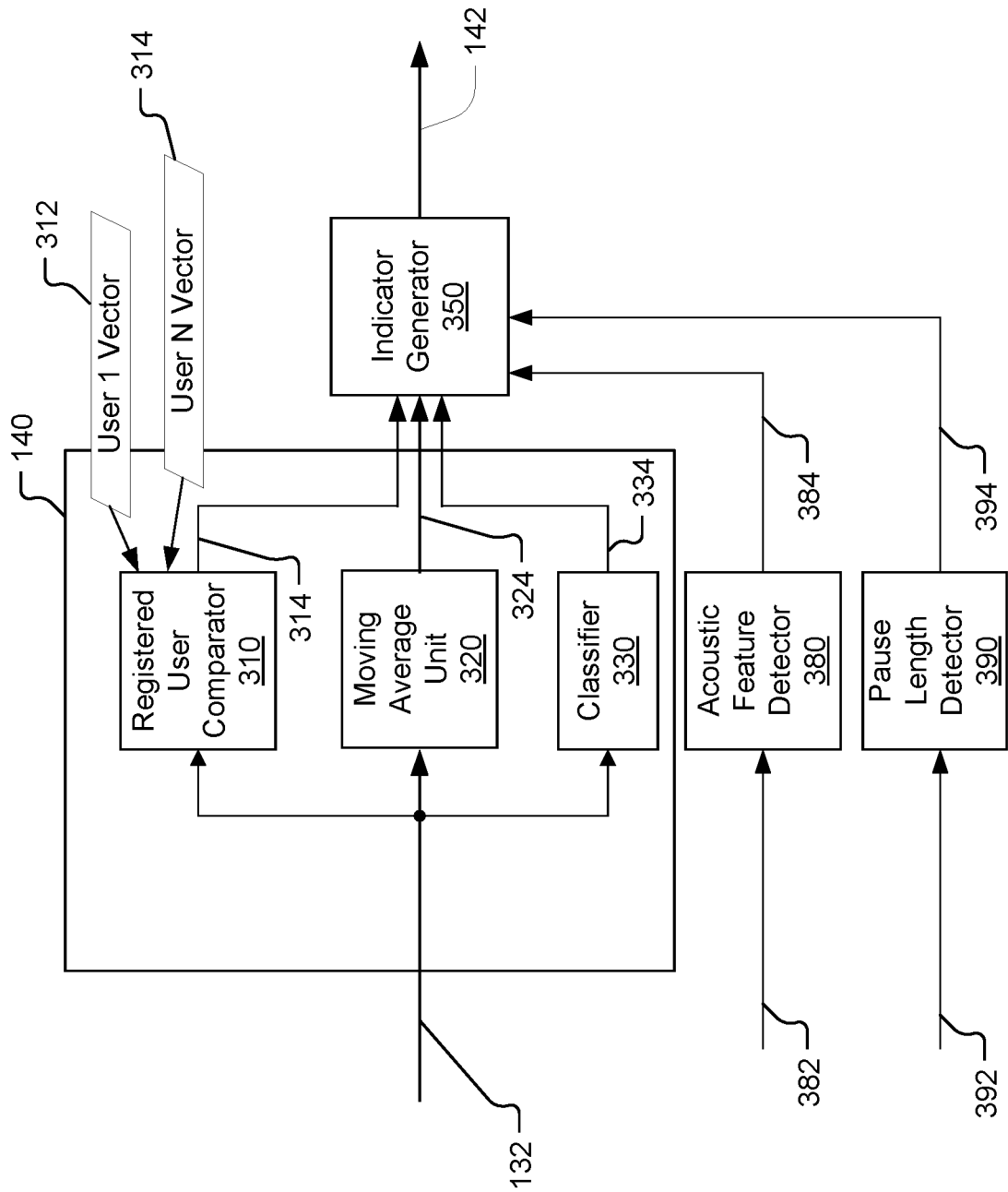
FIG. 3 is a diagram of a particular implementation of components that may be incorporated in the device of FIG. 1.

FIG. 3 is a diagram of a particular implementation of components that may be implemented in the device 102, including the speaker vector comparator 140 that includes a registered user comparator 310, a moving average unit 320, and a classifier 330. The speaker vector comparator 140 is coupled to and an indicator generator 350. An acoustic feature detector 380 and a pause length detector 390 are also coupled to the indicator generator 350.

The registered user comparator 310 is configured to compare a speaker vector, such as the speaker vector 132, to one or more registered user vectors, illustrated as multiple user vectors, from a first user vector 312 up to an Nth user vector 314 (N is an integer greater than 0). Each of the user vectors 312-314 includes values that indicate speech characteristics of a corresponding one of the registered users of the device 102. For example, the device 102 can record and analyze speech of each of the registered users to generate the user vector for that user. The registered user comparator 310 can compare each speaker vector to one or more of the user vectors 312-314 to determine a most likely user associated with the speaker vector and may further determine a confidence level that the speaker vector represents an utterance of that user. During processing of speaker vectors associated with the utterance, such as the speaker vectors $S_1, S_2, \ldots S_{t-1}$ of FIG. 3, the registered user comparator 310 continues to determine that the speaker vectors indicate speech of the identified user. However, when a received speaker vector indicates a change in detected speaker characteristics, such as the speaker vector $S_t$ of FIG. 3, the registered user comparator 310 can determine that the speaker vector no longer indicates speech of the identified user, which can be used to determine the speaker's utterance has ended. The registered user comparator 310 generates an output 314 (e.g., an indicator) that indicates whether the registered user comparator 310 has detected the frame as corresponding to an end of an utterance of a particular speaker.

The moving average unit 320 is configured to determine a moving average of speaker vector values associated with an utterance and to detect when a particular speaker vector differs from the moving average by more than a threshold amount. Such a detected difference in the speaker vector, as compared to the moving average of the speaker vectors during the utterance, indicates that the utterance has ended. The moving average unit 320 generates an output 324 (e.g., an indicator) that indicates whether the moving average unit 320 has detected the frame as corresponding to an end of an utterance of a particular speaker.

The classifier 330 includes a neural network that is trained to detect whether an end-of-utterance condition has been met. The classifier 330 can process each received speaker vector and generate an output indicating whether the speaker vector is indicative of an end of an utterance. The classifier 330 generates an output 334 (e.g., an indicator) that indicates whether the classifier 330 has detected the frame as corresponding to an end of an utterance of a particular speaker.

The acoustic feature detector 380 is configured to process an input signal 382, such as one or more frames of the audio signal 114, to detect an end-of-utterance condition based on one or more acoustic characteristics, such as voice activity detection or other acoustic characteristics. The acoustic feature detector 380 generates an output 384 indicating whether an end-of-utterance condition has been detected.

The pause length detector 390 is configured to process an input signal 392, such as one or more frames of the audio signal 114, to detect an end-of-utterance condition based on a pause length in the audio signal 114. The pause length detector 390 generates an output 394 indicating whether an end-of-utterance condition has been detected.

The indicator generator 350 is configured to receive the output 314 of the registered user comparator 310, the output 324 of the moving average unit 320, the output 334 of the classifier 330, the output 384 of the acoustic feature detector 380, and the output 394 of the pause length detector 390, and to process the received outputs to generate the indicator 142. In some implementations, the indicator generator 350 is configured to apply a decision tree or other logic to determine whether to generate the indicator 142 indicating that an end-of-utterance has been detected.

For example, when the acoustic feature detector 380 and the pause length detector 390 indicate that an end-of-utterance has been detected, the indicator generator 350 may treat such indication as a reliable detection of an end-of-utterance. However, because the acoustic feature detector 380 and the pause length detector 390 may fail to reliably detect that an utterance has ended in the presence of speech-like background noise, the indicator generator 350 may treat a detection of an end-of-utterance from the speech vector comparator 140 as reliable, even in the absence of corresponding end-of-utterance detection from the acoustic feature detector 380 and the pause length detector 390.

The indicator generator 350 may further apply a decision process to interpret outputs of the registered user comparator 310, the moving average unit 320, and the classifier 330. For example, when the 314 output of the registered user comparator 310 indicates a match with one of the user vectors 312-314 with over a threshold level of confidence, the indicator generator 350 may determine the indicator 142 based primarily (or entirely) on the output 314 of the registered user comparator 310. However, when the registered user comparator 310 does not indicate a match with one of the user vectors 312-314 with over a threshold level of confidence, the indicator generator 350 may determine the indicator 142 based primarily (or entirely) on the output 324 of the moving average unit 320, the output 334 of the classifier 330, or a combination thereof. In some implementations, the indicator generator 350 is configured to indicate that an end-of-utterance is detected in response to detection of an end-of-utterance by either of the moving average unit 320 or the classifier 330. In other implementations, the indicator generator 350 is configured to not indicate that an end-of-utterance is detected until both of the moving average unit 320 and the classifier 330 indicate end-of utterance detection.

Although the implementation of speaker vector comparator 140 is depicted in FIG. 3 as including the registered user comparator 310, the moving average unit 320, and the classifier 330, in other implementations one or more of the registered user comparator 310, the moving average unit 320, or the classifier 330 can be omitted. For example, in some implementations the speaker vector comparator 140 includes a single one of the registered user comparator 310, the moving average unit 320, and the classifier 330. In other implementations, the speaker vector comparator 140 includes two one of the registered user comparator 310, the moving average unit 320, and the classifier 330. In some implementations, one or more other mechanisms can be included to determine whether the speaker vector 132 corresponds to an end-of-utterance, in place of, or in addition to, the described components. Although FIG. 3 depicts that the acoustic feature detector 380 and the pause length detector 390 can be included, in other implementations one or both of the acoustic feature detector 380 and the pause length detector 390 can be omitted, replaced with one or more other end-of-utterance detectors, or supplemented with one or more additional end-of utterance detectors. Thus, in some implementations, the speaker vector comparator 140 can be used exclusively for end-of-utterance detection, and in other implementations the speaker vector comparator 140 is part of an end-of-utterance detection system that include multiple types of end-of-utterance detectors to provide a variety of detection capabilities across various conditions.

Figure 4:
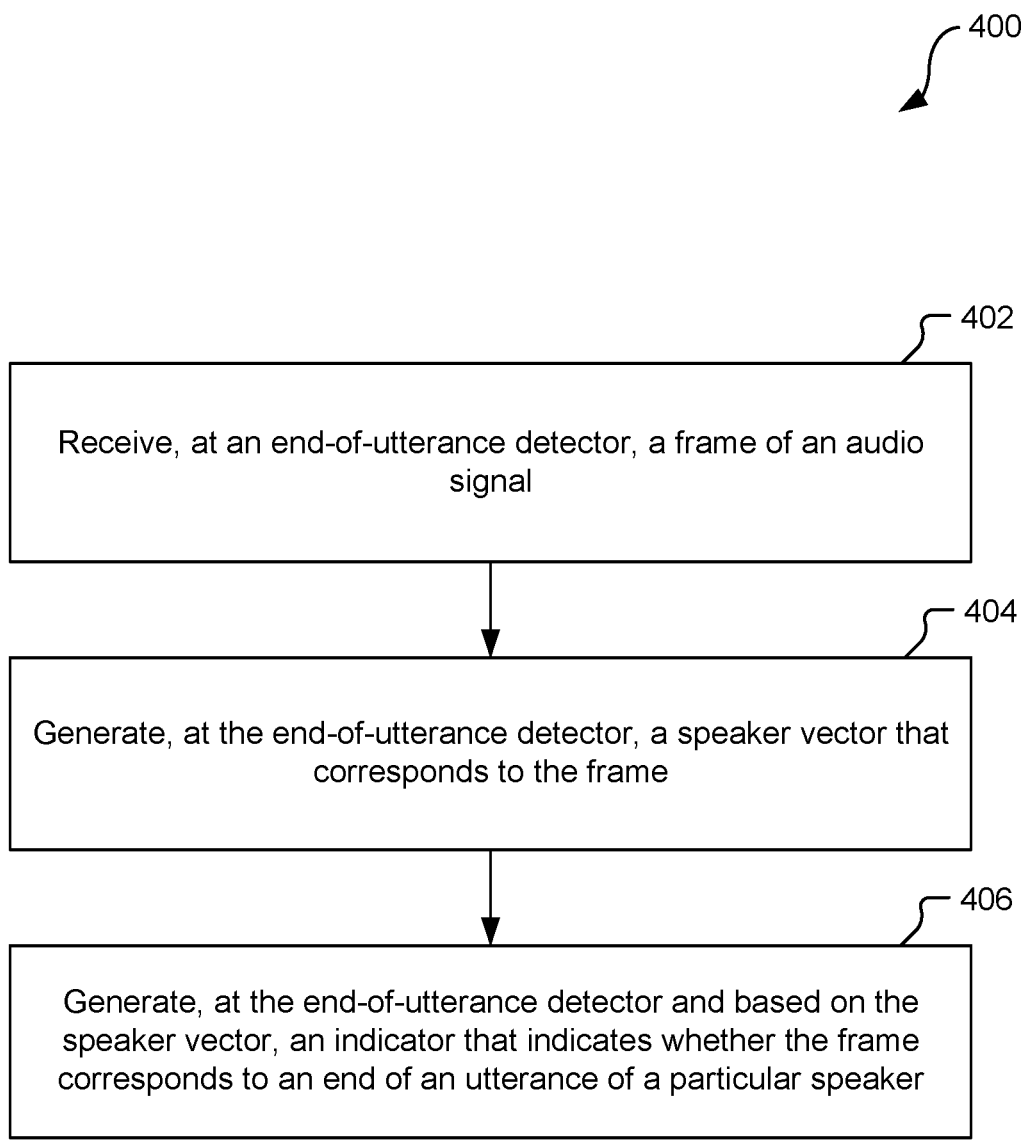
FIG. 4 is diagram of a particular implementation of a method of end-of-utterance detection that may be performed by the device of FIG. 1.

Referring to FIG. 4, a particular implementation of a method 400 of end-of-utterance detection is depicted that may be performed by the device 102 of FIG. 1.

The method 400 includes receiving, at an end-of-utterance detector, a frame of an audio signal, at 402. For example, the frame 116 is received at the end-of-utterance detector 120.

The method 400 also includes generating, at the end-of-utterance detector, a speaker vector that corresponds to the frame, at 404. For example, the speaker vector extractor 130 generates the speaker vector 132. In some implementations, generating the speaker vector includes generating an embedding (e.g., hidden layer variables) using a neural network that is trained to distinguish speakers based on speech and/or voice characteristics and independently of speech content (e.g., without keywords).

The method 400 also includes generating, at the end-of-utterance detector and based on the speaker vector, an indicator that indicates whether the frame corresponds to an end of an utterance of a particular speaker, at 406. For example, the speaker vector comparator 140 generates the indicator 142 based on the speaker vector 132. In some implementations, the method 400 also includes performing automatic speech recognition on one or more frames of the audio signal that include the utterance, such as at the ASR engine 150 of FIG. 1.

In some implementations, the frame is included in multiple overlapping frames of the audio signal, such as depicted in FIG. 2. Generating the indicator can include comparing the speaker vector to at least one previously processed speaker vector that corresponds to at least one of the multiple overlapping frames and that includes the utterance of the particular speaker. For example, comparing the speaker vector to the at least one previously processed speaker vector can include comparing the speaker vector to a moving average of speaker vectors that include the at least one previously processed speaker vector, such as at the moving average unit 320 of FIG. 3.

In some implementations, the frame is included in multiple frames of the audio signal, and a prior speaker vector is based on one of the multiple frames that is received at the at the end-of-utterance detector prior to the frame and that corresponds to at least a portion of the utterance. The method 400 can also include determining that the utterance corresponds to the particular speaker based on a comparison of the prior speaker vector to a registered user vector corresponding to the particular speaker, such as at the registered user comparator 310 of FIG. 3. Generating the indicator can include comparing the speaker vector to the registered user vector corresponding to the particular speaker to determine whether the frame includes speech of the particular speaker.

In some implementations, generating the indicator includes processing the speaker vector at a trained neural network classifier to generate an output indicating whether the frame corresponds to an in-utterance frame or an end-of-utterance frame. For example, the speaker vector can be processed at the classifier 330 of FIG. 3.

By generating and processing the speaker vector for the frame and generating the indicator based on the speaker vector, the method 400 enables end-of-utterance detection even in the presence of speech-like background noise. As a result, speech recognition processing can be performed with reduced latency as compared to systems that perform end-of-utterance detection based solely on a period of silence or voice activity detection.

The method 400 of FIG. 4 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 400 of FIG. 4 may be performed by a processor that executes instructions, such as described with reference to FIG. 5.

Figure 5:
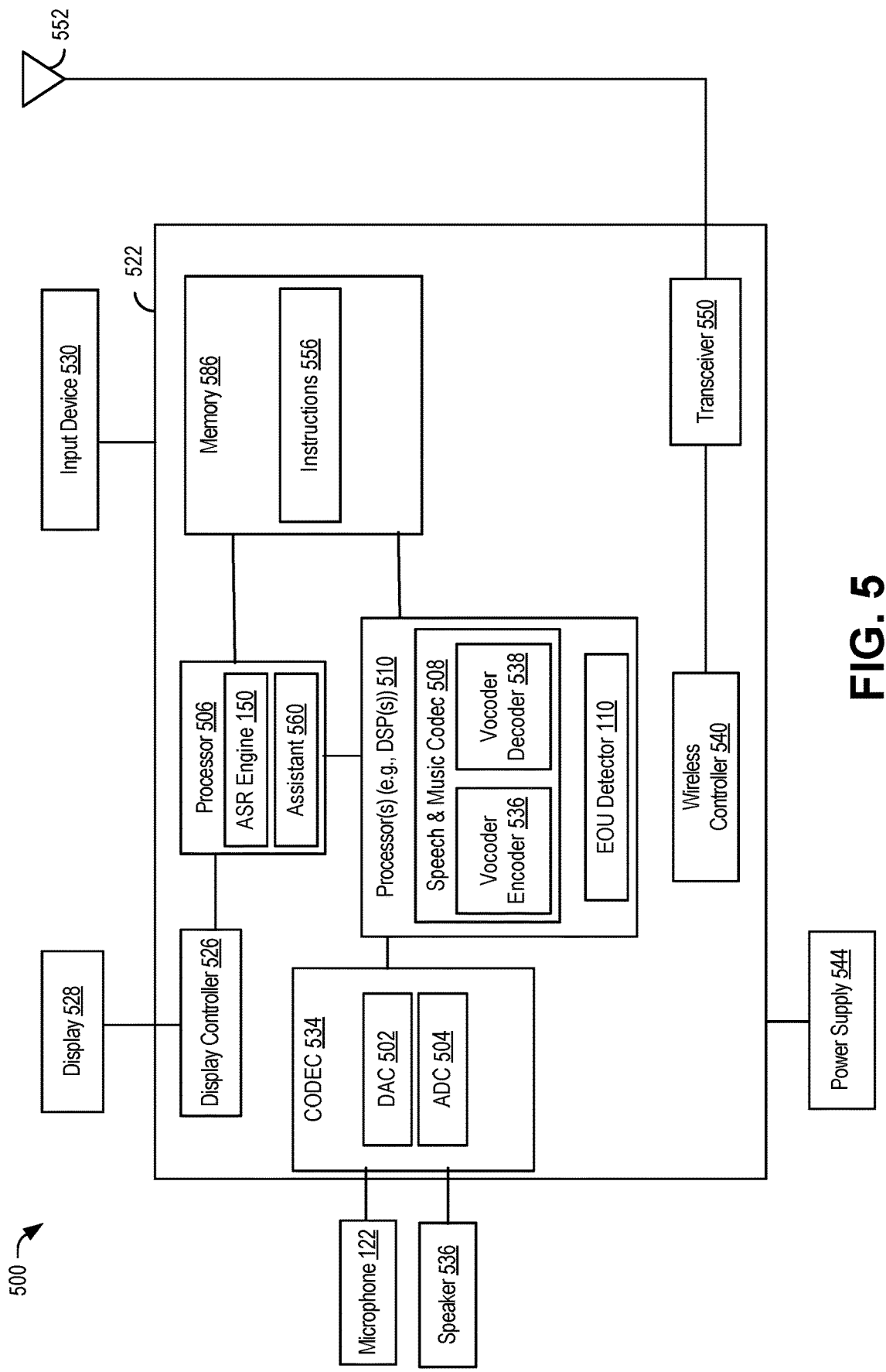
FIG. 5 is a block diagram of a particular illustrative example of a device that is operable to perform end-of-utterance detection.

Referring to FIG. 5, a block diagram of a particular illustrative implementation of a device is depicted and generally designated 500. In various implementations, the device 500 may have more or fewer components than illustrated in FIG. 5. In an illustrative implementation, the device 500 may correspond to the device 102. In an illustrative implementation, the device 500 may perform one or more operations described with reference to FIGS. 1-4.

In a particular implementation, the device 500 includes a processor 506 (e.g., a central processing unit (CPU)). The device 500 may include one or more additional processors 510 (e.g., one or more DSPs). The processors 510 may include a speech and music coder-decoder (CODEC) 508 and the auto-equalizer 162. The speech and music codec 508 may include a voice coder ("vocoder") encoder 536, a vocoder decoder 538, or both.

The device 500 may include a memory 586 and a CODEC 534. The memory 586 may include instructions 556, that are executable by the one or more additional processors 510 (or the processor 506) to implement the functionality described with reference to the end-of-utterance detector 120, the ASR engine 150, an assistance application 560, or any combination thereof. The device 500 may include a wireless controller 540 coupled, via a transceiver 550, to an antenna 552.

The device 500 may include a display 528 coupled to a display controller 526. A speaker 536 and the microphone 122 may be coupled to the CODEC 534. The CODEC 534 may include a digital-to-analog converter 502 and an analog-to-digital converter 504. In a particular implementation, the CODEC 534 may receive analog signals from the microphone 122, convert the analog signals to digital signals using the analog-to-digital converter 504, and provide the digital signals to the speech and music codec 508. The speech and music codec 508 may process the digital signals, and the digital signals may further be processed by the end-of-utterance detector 120. In a particular implementation, the speech and music codec 508 may provide digital signals to the CODEC 534. The CODEC 534 may convert the digital signals to analog signals using the digital-to-analog converter 502 and may provide the analog signals to the speakers 536.

In a particular implementation, the device 500 may be included in a system-in-package or system-on-chip device 522. In a particular implementation, the memory 586, the processor 506, the processors 510, the display controller 526, the CODEC 534, and the wireless controller 540 are included in a system-in-package or system-on-chip device 522. In a particular implementation, an input device 530 and a power supply 544 are coupled to the system-on-chip device 522. Moreover, in a particular implementation, as illustrated in FIG. 5, the display 528, the input device 530, the speaker 536, the microphone 122, the antenna 552, and the power supply 544 are external to the system-on-chip device 522. In a particular implementation, each of the display 528, the input device 530, the speaker 536, the microphone 122, the antenna 552, and the power supply 544 may be coupled to a component of the system-on-chip device 522, such as an interface or a controller.

The device 500 may include a smart speaker (e.g., the processor 506 may execute the instructions 556 to run a voice-controlled digital assistant application 560), a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In conjunction with the described implementations, an apparatus includes means for generating a speaker vector that corresponds to a frame of an audio signal. For example, the means for generating a speaker vector that corresponds to a frame of an audio signal can correspond to the speaker vector extractor 130, the end-of-utterance detector 120, the processor 506, the one or more processors 510, one or more other circuits or components configured to generate a speaker vector that corresponds to a frame of an audio signal, or any combination thereof.

The apparatus also includes means for generating, based on the speaker vector, an indicator that indicates whether the frame corresponds to an end of an utterance of a particular speaker. For example, the means for generating the indicator can correspond to the speaker vector comparator 140, the end-of-utterance detector 120, the processor 506, the one or more processors 510, one or more other circuits or components configured to generate the indicator, or any combination thereof.

In some implementations, a non-transitory computer-readable medium (e.g., the memory 586) includes instructions (e.g., the instructions 556) that, when executed by one or more processors (e.g., the one or more processors 510 or the processor 506), cause the one or more processors to perform operations for end-of-utterance detection. The operations include receiving, at the one or more processors, a frame of an audio signal, generating, at the one or more processors, a speaker vector that corresponds to the frame, and generating, at the one or more processors and based on the speaker vector, an indicator that indicates whether the frame corresponds to an end of an utterance of a particular speaker.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to perform end-of-utterance detection, the device comprising:
    a speaker vector extractor configured to receive a frame of an audio signal and to generate a speaker vector that corresponds to the frame; and
    a speaker vector comparator configured to process the speaker vector and to generate an indicator that indicates whether the frame corresponds to an end of an utterance of a particular speaker, wherein the indicator indicates the end of the utterance responsive to a comparison between the speaker vector and a stored speaker vector corresponding to the particular speaker indicating that the speaker vector does not match user speech characteristics indicated by the stored speaker vector.

2. The device of claim 1, wherein the speaker vector extractor is configured to generate the speaker vector using a neural network that is trained to distinguish between speakers.

3. The device of claim 1, further comprising:
    a memory configured to store instructions; and
    one or more processors configured to execute the instructions,
    wherein the speaker vector extractor and the speaker vector comparator are implemented via execution of the instructions by the one or more processors.

4. The device of claim 1, wherein the speaker vector extractor and the speaker vector comparator are implemented in a wireless speaker and voice command device with an integrated assistant application.

5. The device of claim 1, further comprising a microphone configured to generate the frame of the audio signal.

6. The device of claim 1, wherein the frame is included in multiple overlapping frames of the audio signal, and wherein the speaker vector comparator is configured to compare the speaker vector to at least one previously processed speaker vector that corresponds to at least one of the multiple overlapping frames and that includes the utterance of the particular speaker, the at least one previously processed speaker vector including the stored speaker vector.

7. The device of claim 6, wherein the speaker vector comparator is configured to compare the speaker vector to a moving average of speaker vectors that include the at least one previously processed speaker vector.

8. The device of claim 1, wherein the frame is included in multiple frames of the audio signal that are received at the speaker vector extractor, wherein the speaker vector extractor is configured to generate a prior speaker vector based on one of the multiple frames that is received at the speaker vector extractor prior to the frame and that corresponds to at least a portion of the utterance, and wherein the speaker vector comparator is configured to:
    determine that the utterance corresponds to the particular speaker based on a comparison of the prior speaker vector to a registered user vector corresponding to the particular speaker; and
    compare the speaker vector to the registered user vector corresponding to the particular speaker to determine whether the frame includes speech of the particular speaker, wherein the register user vector corresponds to the stored speaker vector.

9. The device of claim 1, wherein the speaker vector comparator includes a trained neural network classifier configured to process the speaker vector to generate an output indicating whether the frame corresponds to an in-utterance frame or an end-of-utterance frame, wherein the indicator is generated based in part on the output.

10. The device of claim 1, further comprising an acoustic feature detector configured to process the frame and to generate a second indicator that indicates whether the frame corresponds to an end of an utterance based on acoustic characteristics, wherein the acoustic characteristics are distinct from the user speech characteristics.

11. A method of end-of-utterance detection, the method comprising:
    receiving, at an end-of-utterance detector, a frame of an audio signal;

generating, at the end-of-utterance detector, a speaker vector that corresponds to the frame; and generating, at the end-of-utterance detector and based on the speaker vector, an indicator that indicates whether the frame corresponds to an end of an utterance of a particular speaker, wherein the indicator indicates the end of the utterance responsive to a comparison between the speaker vector and a stored speaker vector corresponding to the particular speaker indicating that the speaker vector does not match user speech characteristics indicated by the stored speaker vector.

12. The method of claim 11, wherein the speaker vector is generated using a neural network that is trained to distinguish between speakers.

13. The method of claim 11, wherein the stored speaker vector corresponds to a particular speaker vector generated from a prior frame.

14. The method of claim 11, wherein the stored speaker vector corresponds to a registered speaker vector corresponding to a registered user.

15. The method of claim 11, wherein the frame is included in multiple frames of the audio signal, wherein a prior speaker vector is based on one of the multiple frames that is received at the at the end-of-utterance detector prior to the frame and that corresponds to at least a portion of the utterance, the method further comprising:
determining that the utterance corresponds to the particular speaker based on a comparison of the prior speaker vector to a registered user vector corresponding to the particular speaker, and
wherein generating the indicator includes comparing the speaker vector to the registered user vector corresponding to the particular speaker to determine whether the frame includes speech of the particular speaker, wherein the register user vector corresponds to the stored speaker vector.

16. The method of claim 11, wherein generating the indicator includes processing the speaker vector at a trained neural network classifier to generate an output indicating whether the frame corresponds to an in-utterance frame or an end-of-utterance frame, wherein the indicator is generated based in part on the output.

17. The method of claim 11, further performing automatic speech recognition on one or more frames of the audio signal that include the utterance.

18. A non-transitory computer-readable medium comprising instructions that, when executed by one or more processors of a device, cause the one or more processors to perform operations for end-of-utterance detection, the operations comprising:
receiving, at the one or more processors, a frame of an audio signal;
generating, at the one or more processors, a speaker vector that corresponds to the frame; and
generating, at the one or more processors and based on the speaker vector, an indicator that indicates whether the frame corresponds to an end of an utterance of a particular speaker, wherein the indicator indicates the end of the utterance responsive to a comparison between the speaker vector and a stored speaker vector corresponding to the particular speaker indicating that the speaker vector does not match user speech characteristics indicated by the stored speaker vector.

19. The non-transitory computer-readable medium of claim 18, wherein the speaker vector is generated using a neural network that is trained to distinguish between speakers.

20. The non-transitory computer-readable medium of claim 18, wherein the frame is included in multiple overlapping frames of the audio signal, and wherein generating the indicator includes comparing the speaker vector to at least one previously processed speaker vector that corresponds to at least one of the multiple overlapping frames and that includes the utterance of the particular speaker, the at least one previously processed speaker vector including the stored speaker vector.

21. The non-transitory computer-readable medium of claim 20, wherein comparing the speaker vector to the at least one previously processed speaker vector includes comparing the speaker vector to a moving average of speaker vectors that include the at least one previously processed speaker vector.

22. The non-transitory computer-readable medium of claim 18, wherein the frame is included in multiple frames of the audio signal, wherein a prior speaker vector is based on one of the multiple frames that is received at the at one or more processors tor prior to the frame and that corresponds to at least a portion of the utterance, the operations further comprising:
determining that the utterance corresponds to the particular speaker based on a comparison of the prior speaker vector to a registered user vector corresponding to the particular speaker, and
wherein generating the indicator includes comparing the speaker vector to the registered user vector corresponding to the particular speaker to determine whether the frame includes speech of the particular speaker, wherein the register user vector corresponds to the stored speaker vector.

23. The non-transitory computer-readable medium of claim 18, wherein generating the indicator includes processing the speaker vector at a trained neural network classifier to generate an output indicating whether the frame corresponds to an in-utterance frame or an end-of-utterance frame, wherein the indicator is generated based in part on the output.

24. The non-transitory computer-readable medium of claim 18, the operations further performing automatic speech recognition on one or more frames of the audio signal that include the utterance.

25. An apparatus to perform end-of-utterance detection, the apparatus comprising:
means for generating a speaker vector that corresponds to a frame of an audio signal; and
means for generating, based on the speaker vector, an indicator that indicates whether the frame corresponds to an end of an utterance of a particular speaker, wherein the indicator indicates the end of the utterance responsive to a comparison between the speaker vector and a stored speaker vector corresponding to the particular speaker indicating that the speaker vector does not match user speech characteristics indicated by the stored speaker vector.

26. The apparatus of claim 25, wherein the means for generating the speaker vector includes a neural network that is trained to distinguish between speakers.

27. The apparatus of claim 25, wherein the frame is included in multiple overlapping frames of the audio signal, and wherein the means for generating the indicator is configured to compare the speaker vector to at least one previously processed speaker vector that corresponds to at least one of the multiple overlapping frames and that includes the utterance of the particular speaker, the at least one previously processed speaker vector including the stored speaker vector.

28. The apparatus of claim 25, wherein the frame is included in multiple frames of the audio signal, wherein a prior speaker vector is based on one of the multiple frames that is received at the at the means for generating the indicator prior to the frame and that corresponds to at least a portion of the utterance, the apparatus further comprising:
  means for determining that the utterance corresponds to the particular speaker based on a comparison of the prior speaker vector to a registered user vector corresponding to the particular speaker, and
  wherein the means for generating the indicator is configured to compare the speaker vector to the registered user vector corresponding to the particular speaker to determine whether the frame includes speech of the particular speaker, wherein the register user vector corresponds to the stored speaker vector.

29. The apparatus of claim 25, wherein the means for generating the indicator is configured to process the speaker vector at a trained neural network classifier to generate an output indicating whether the frame corresponds to an in-utterance frame or an end-of-utterance frame, wherein the indicator is generated based in part on the output.

30. The apparatus of claim 25, further comprising means for performing automatic speech recognition on one or more frames of the audio signal that include the utterance.

* * * * *